United States Patent
Noh (10) Patent No.: US 7,306,880 B2
(45) Date of Patent: Dec. 11, 2007

(54) ELECTROLYTE FOR A LITHIUM ION BATTERY AND A LITHIUM ION BATTERY COMPRISING THE SAME

(75) Inventor: Hyeong-Gon Noh, Suwon (KR)

(73) Assignee: Samsung SDI Co., Ltd., Suwon (KR)

( * ) Notice: Subject to any disclaimer, the term of this patent is extended or adjusted under 35 U.S.C. 154(b) by 650 days.

(21) Appl. No.: 10/716,812

(22) Filed: Nov. 18, 2003

(65) Prior Publication Data

US 2004/0101762 A1    May 27, 2004

(30) Foreign Application Priority Data

Nov. 20, 2002    (KR)    ............... 10-2002-0072475

(51) Int. Cl.
   *H01M 6/16*    (2006.01)
(52) U.S. Cl. ................................... 429/332
(58) Field of Classification Search ............... 429/332
   See application file for complete search history.

(56) References Cited

U.S. PATENT DOCUMENTS

| 6,015,638 | A * | 1/2000 | Ventura et al. ............ 429/307 |
| 6,296,783 | B1  | 10/2001 | Shindo et al. |
| 6,841,305 | B2 * | 1/2005 | Ueda et al. ............... 429/328 |
| 6,949,317 | B2 * | 9/2005 | Yoshida et al. ............ 429/303 |
| 6,958,198 | B2 * | 10/2005 | Iwamoto et al. ........... 429/122 |

FOREIGN PATENT DOCUMENTS

| EP | 1 213778 A2 | 6/2002 |
| JP | 1999-0082202 | 11/1999 |
| JP | 11329494 A * | 11/1999 |

OTHER PUBLICATIONS

Megahed, et al., "Lithium-ion rechargeable batteries" J. Power Sources, 51 (1994), pp. 79-104.
Yang, et al., "Composition analysis of the passive film on the carbon electrode of a lithium-ion battery with an EC-based electrolyte" Journal of Power Sources 72 (1998) 66-70.
Takami, et al., "Laminated Thin Li-Ion Batteries Using a Liquid Electrolyte" Journal of the Electrochemical Society, 149(1) A9-A12 (2002).

* cited by examiner

*Primary Examiner*—Tracy Dove
(74) *Attorney, Agent, or Firm*—Christie, Parker & Hale, LLP (57) ABSTRACT

An electrolyte for a lithium secondary battery comprises a non-aqueous organic solvent including 20 to 95 vol % of an ester-based or ether-based organic solvent based on the total amount of organic solvent; lithium salts; and an additive compound having at least two carbonate groups. A lithium secondary battery including this electrolyte has good swelling inhibition properties as well as electrochemical properties such as capacity and cycle life.

24 Claims, 3 Drawing Sheets

ELECTROLYTE FOR A LITHIUM ION BATTERY AND A LITHIUM ION BATTERY COMPRISING THE SAME

CROSS REFERENCE TO RELATED APPLICATION

This application claims priority to Korean patent application No. 2002-72475 filed in the Korean Intellectual Property Office on Nov. 20, 2002, the disclosure of which is incorporated herein by reference.

FIELD OF THE INVENTION

The present invention relates to an electrolyte for a lithium secondary battery and a lithium secondary battery comprising the same, and more particularly to an electrolyte for a lithium secondary battery capable of preventing the battery from swelling while maintaining the electrochemical properties of the battery such as capacity and cycle life, and a lithium secondary battery comprising the same.

BACKGROUND OF THE INVENTION

Due to recent trends toward more compact and lighter portable electronic equipment, there has been a growing need to develop a high performance and large capacity battery to power this portable electronic equipment. A lithium secondary battery, having an average discharge potential of 3.7 V (i.e., a battery having substantially a 4 V average discharge potential) is considered to be an essential element in the digital generation since it is an indispensable energy source for portable digital devices such as cellular telephones, notebook computers, and camcorders. (i.e., the "3C" devices).

The average discharge voltage of a lithium secondary battery is about 3.6 to 3.7V, which is higher than alkali batteries, Ni-MH batteries, Ni—Cd batteries and the like. An electrolyte that is electrochemically stable in the charge and discharge voltage range of 0 to 4.2V is required in order to generate such a high driving voltage. As a result, a mixture of non-aqueous carbonate-based solvents, such as ethylene carbonate, dimethyl carbonate, and diethyl carbonate is used as an electrolyte. However, such an electrolyte has significantly lower ion conductivity than an aqueous electrolyte that is used in a Ni-MH battery or a Ni—Cd battery, thereby resulting in the deterioration of battery characteristics during charging and discharging at a high rate.

During the initial charge of a lithium secondary battery, lithium ions, which are released from the lithium-transition metal oxide positive electrode of the battery, are transferred to a carbon negative electrode where the ions are intercalated into the carbon. Because of its high reactivity, lithium reacts with the carbon negative electrode to produce $Li_2CO_3$, LiO, LiOH, and the like, thereby forming a thin film on the surface of the negative electrode. This film is referred to as an organic solid electrolyte interface (SEI) film. The organic SEI film formed during the initial charge not only prevents the reaction between lithium ions and the carbon negative electrode or other materials during charging and discharging, but it also acts as an ion tunnel, allowing the passage of only lithium ions. The ion tunnel prevents disintegration of the structure of the carbon negative electrode, which is caused by co-intercalation of organic solvents having a high molecular weight along with solvated lithium ions into the carbon negative electrode.

Once the organic SEI film is formed, lithium ions do not react again with the carbon electrode or other materials, such that an amount of lithium ions is maintained. That is, carbon of the negative electrode reacts with an electrolyte during the initial charging, thus forming a passivation layer such as an organic SEI film on the surface of the negative electrode such that the electrolyte solution no longer decomposes, and stable charging and discharging are maintained (*J. Power Sources*, 51(1994), 79-104). For these reasons, in the lithium secondary battery, there is no irreversible formation reaction of the passivation layer, and a stable cycle life after the initial charging reaction is maintained.

However, gases are generated inside the battery due to decomposition of a carbonate-based organic solvent during the organic SEI film-forming reaction (*J. Power Sources*, 72(1998), 66-70). These gases include $H_2$, CO, $CO_2$, $CH_4$, $C_2H_6$, $C_3H_8$, $C_3H_6$, and the like depending on the type of non-aqueous organic solvent and negative active material used. The thickness of the battery increases during charging due to the generation of gases inside the battery.

The passivation layer slowly disintegrates by electrochemical energy and heat energy, which increases with the passage of time when the battery is stored at a high temperature after it is charged. As a result, a side reaction in which an exposed surface of the negative electrode reacts with surrounding electrolyte occurs continuously. The internal pressure of the battery increases with this generation of gases, inducing the deformation of prismatic batteries or pouch batteries. As a result, regional differences in the cohesion among electrodes inside the electrode assembly (positive and negative electrodes, and separator) of the battery occur, thereby deteriorating the performance and safety of the battery and making it difficult to mount the lithium secondary battery set into electronic equipment.

In order to improve low temperature characteristics, a lithium secondary battery having a liquid electrolyte uses an organic solvent with a low boiling point which induces swelling of a prismatic or pouch battery during high temperature storage. As a result, the reliability and safety of the battery deteriorate at a high temperature.

Accordingly, extensive research into a liquid electrolyte with a high boiling point is needed. An example of an electrolyte with a high boiling point is an ester solvent such as gamma butyrolactone. When using 30 to 70% of an ester solvent, cycle life characteristics significantly deteriorate and therefore it is difficult to use it for batteries. It has been suggested that as an electrolyte with a high boiling point, a mixture of gamma butyrolactone/ethylene carbonate (7/3) can be used, and a boron-coated mesocarbon fiber (MCF) as a negative active material can be used to reduce swelling at a high temperature and improve cycle life characteristics (Journal of Electrochemical Society, 149(1) A(9)~A12 (2002)). However, when an uncoated carbonaceous material is used as a negative active material, cycle life characteristics deteriorate even when an electrolyte with a high boiling point is used. Therefore, there is a need to pursue research on electrolytes to improve cycle life as well as swelling inhibition properties at high temperature.

SUMMARY OF THE INVENTION

To address the problems stated above, the present invention provides an electrolyte for a lithium secondary battery which has been found to improve cycle life as well as swelling inhibition properties at a high temperature, and a lithium secondary battery comprising the same.

In one embodiment, the present invention provides an electrolyte for a lithium secondary battery comprising a non-aqueous organic solvent including 20 to 95 vol % of an ester-based or ether-based organic solvent based on the total amount of organic solvent; lithium salts; and an additive compound having at least two carbonate groups.

Other features and/or advantages of the present invention will be apparent from the following description taken in conjunction with the accompanying drawings, in which like reference characters designate the same or similar parts throughout the drawings. The present invention also provides a lithium secondary battery comprising a positive electrode comprising a material that is capable of reversible intercalation/deintercalation of lithium ions; a negative electrode including a lithium metal, a lithium-containing alloy, a material that is capable of reversible intercalation/deintercalation of lithium ions, or a material that is capable of reversibly forming a lithium-containing compound as a negative active material; a separator interposed between the positive and negative electrodes; and an electrolyte comprising a non-aqueous organic solvent including 20 to 95 vol % of an ester-based or ether-based organic solvent based on the total amount of organic solvent; at least one lithium salt; and an additive compound having at least two carbonate groups.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

In the following detailed description, embodiments of the invention are shown and described, simply by way of illustration of the best mode contemplated by the inventors of carrying out the invention. As will be realized, the invention is capable of modification in various respects, all without departing from the invention. Accordingly, the drawings and description are to be regarded as illustrative in nature, and not restrictive.

Figure 1:
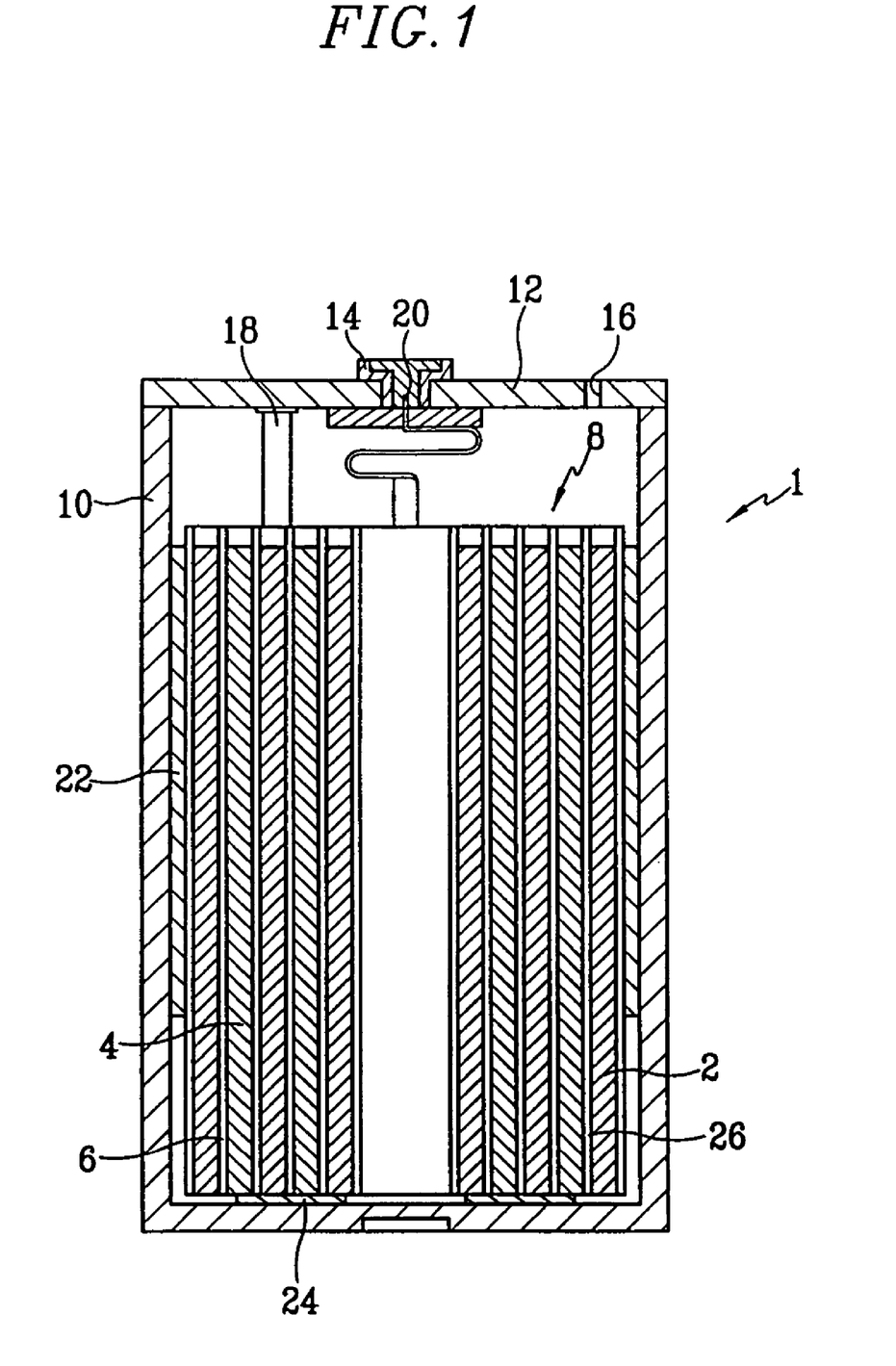
FIG. 1 is a cross-sectional view of a prismatic lithium secondary battery cell.

A cross-sectional view of a general non-aqueous Li-ion cell is shown in FIG. 1. The Li-ion cell 1 is fabricated by inserting an electrode assembly 8 including a positive electrode 2, a negative electrode 4, and a separator 6 between the positive and negative electrodes, into a battery case 10. An electrolyte 26 is injected into the battery case 10 and impregnated into the separator 6. The upper part of the case 10 is sealed with a cap plate 12 and a sealing gasket 14. The cap plate 12 has a safety vent 16 to release pressure. A positive electrode tab 18 and a negative electrode tab 20 are respectively attached on the positive electrode 2 and negative electrode 4. Insulators 22 and 24 are installed on the lower part and the side part of the electrode assembly 8 to prevent a short circuit occurrence in the battery.

The electrolyte of the present invention includes a solvent with a high boiling point and an additive compound that improve both swelling inhibition at a high temperature and cycle life characteristics of the battery, even though a conventional material that is capable of reversible intercalation/deintercalation of lithium ions is used as a positive active material and a conventional carbonaceous material is used as a negative material.

The electrolyte for a lithium secondary battery comprises a non-aqueous organic solvent including 20 to 95 vol % of an ester-based or ether-based organic solvent based on the total amount of organic solvent; one or more lithium salts; and an additive compound having at least two carbonate groups.

An organic solvent with a high boiling point is capable of improving swelling inhibition properties at a high temperature. But there is generally a problem in that if an organic solvent with a high boiling point is used in an amount of more than 30 vol % based on the total amount of electrolyte, capacity and cycle life characteristics of the battery significantly deteriorate. In the present invention, even if the organic solvent with a high boiling point is used in an amount of more than 30 vol %, the problems described above do not occur.

Currently-used positive active materials include lithium-cobalt-based oxides, lithium-manganese-based oxides, lithium-nickel-based oxides, lithium-nickel-manganese-based oxides, and the like. The lithium-nickel-based and lithium-nickel-manganese-based oxides are inexpensive and manifest a high discharge capacity, but they are limited due to swelling of batteries from gas generation during high-temperature storage. However, the electrolyte of the present invention can address the problem of deterioration of battery performance such as capacity and cycle life even when a lithium-nickel-based or lithium-nickel-manganese-based compound is used as a positive active material and a conventional carbonaceous material is used as a negative material.

The non-aqueous organic solvent includes 20 to 95 vol %, preferably 30 to 95 vol %, of an ester-based or ether-based organic solvent based on the total amount of organic solvent. When the amount of ester-based or ether-based organic solvent is less than 20 vol %, swelling inhibition at a high temperature is not sufficient. When the amount of ester-based or ether-based organic solvent is more than 95 vol %, the battery performance deteriorates.

Examples of suitable esters include γ-butyrolactone (γ-BL), n-methyl acetate, n-ethyl acetate, and n-propyl acetate. An, example of a suitable ether is dibutyl ether. However, the non-aqueous organic solvent is not limited to the above solvents.

In addition, the electrolyte of the present invention may further include carbonate solvents or a mixed solvent of carbonate solvents and aromatic hydrocarbon solvents of Formula (1) in an amount of 5 to 80 vol %. Exemplary carbonate solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), methylisopropyl carbonate, ethylbutyl carbonate, diisopropyl carbonate, dibutyl carbonate, ethylene carbonate (EC), propylene carbonate (PC), and butylene carbonate (BC), but they are not limited thereto. The aromatic hydrogen solvent is represented by the following Formula (1):

(1)

wherein R is a halogen or a $C_1$ to $C_{10}$ alkyl, and n is an integer of 0 to 6, preferably 1 to 5.

Examples of aromatic hydrocarbon solvents include benzene, chlorobenzene, nitrobenzene, fluorobenzene, toluene, fluorotoluene, trifluorotoluene, and xylene.

The electrolyte of the present invention can be prepared by adding an additive compound having at least two carbonate groups and lithium salts to the organic solvent.

The lithium salt acts as a supply source of lithium ions in the battery, making the basic operation of the lithium battery possible. The non-aqueous organic solvent plays the role of a medium wherein ions capable of participating in the electrochemical reaction are mobilized.

The lithium salt is preferably at least one selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The concentration of the lithium salt preferably ranges from 0.6 to 2.0 M, and more preferably from 0.7 to 1.6 M. When the concentration of the lithium salt is less than 0.6 M, the electrolyte performance deteriorates due to its ionic conductivity. When the concentration of the lithium salt is greater than 2.0 M, the lithium ion mobility decreases due to an increase of the electrolyte viscosity.

The additive compound having at least two carbonate groups preferably has the following Formula (2) or (3):

(2)

(3)

It is preferable that the additive compound having at least two carbonate groups has both the carbonates and double bonds. The carbonate groups may comprise linear or cyclic carbonates. All combinations such as cyclic carbonate and cyclic carbonate, linear carbonate and linear carbonate, and cyclic carbonate and linear carbonate are possible.

An example of the additive compound having at least two carbonate groups is a carbonic acid ester having the following Formula (4):

(4)

wherein $R_1$ is hydrogen, a $C_1$ to $C_6$ alkyl, or a $C_6$ to $C_{12}$ aryl, and preferably an ethyl or a phenyl; $R_2$ is $(CH_2)_n$ (n is an integer of 1 to 6); $R_3$ is hydrogen, a $C_1$ to $C_6$ alkyl, or a $C_6$ to $C_{12}$ aryl, and $R_4$ and $R_5$ are each independently hydrogen or a $C_1$ to $C_6$ alkyl.

The additive compound is added in an amount of 0.1 to 10 wt % based on the total amount of the electrolyte. The improvement of cycle life characteristics is not sufficient when the compound is used in an amount of less than 0.1 wt %, and the cycle life characteristics deteriorate when the compound is used in an amount exceeding 10 wt %.

Examples of the carbonic acid ester compound are compounds selected from the group consisting of the following Formula (5), Formula (6), and a mixture thereof:

The electrolyte of the present invention may further include a secondary additive compound along with the additive compound having at least two carbonate groups. The secondary compound includes vinylene carbonate, an organic sulfone compound, or a mixture thereof. The vinylene carbonate is added in an amount of 0.1 to 50 wt %, and preferably 0.1 to 10 wt %, based on the total amount of the electrolyte. The addition effect is not sufficient when the vinylene carbonate is used in an amount of less than 0.1 wt %, and the battery performance deteriorates when the vinylene carbonate is used in an amount exceeding 50 wt %.

The organic sulfone-based compound prevents swelling of batteries at a high temperature and improves cycle life and capacity characteristics when being used with the additive compound having at least two carbonate groups. The organic sulfone-based compound is added in an amount of 0.1 to 5 wt %, and preferably 0.2 to 0.7 wt %, based on the total amount of the electrolyte. The addition effect is not sufficient when the compound is used in an amount of less than 0.1 wt %, and the capacity characteristics deteriorate when the compound is used in an amount exceeding 5 wt %.

The organic sulfone-based compound is represented by the following Formula (7):

(7)

wherein $R_6$ and $R_7$ are each independently selected from the group consisting of primary, secondary, and tertiary alkyl groups, alkenyl groups, aryl groups, and cycloalkyl groups, and each is preferably a $C_1$ to $C_4$ alkyl, a $C_2$ to $C_4$ alkenyl, a $C_6$ to $C_{14}$ aryl, or a $C_3$ to $C_6$ cycloalkyl, or $R_6$ and $R_7$ can be bound together to form a cyclic ring. More preferably, one of $R_6$ and $R_7$ is a halogen-substituted alkyl group, a halogen-substituted alkenyl group, a halogen-substituted aryl group, or a halogen-substituted cycloalkyl group, and either one of $R_6$ or $R_7$ is substantially an alkenyl such as vinyl.

The present invention provides a lithium secondary battery comprising the electrolyte. The lithium secondary battery of the present invention uses any conventional active materials as positive and negative electrodes.

The lithium secondary battery of the present invention includes a positive electrode comprising a material that is capable of reversible intercalation/deintercalation of the lithium ions (lithiated intercalation compound), as a positive active material; a negative electrode comprising a lithium metal, a lithium-containing alloy, a material that is capable of reversible intercalation/deintercalation of lithium ions, or a material that is capable of reversibly forming a lithium-containing compound as a negative active material; a separator interposed between the positive and negative electrodes; and the above-described electrolyte.

Examples of the material for the positive active material that is capable of reversible intercalation/deintercalation of the lithium ions include metal oxides and calcogenide compounds such as $LiMn_2O_4$, $LiCoO_2$, $LiNiO_2$, $LiFeO_2$, and $V_2O_5$; sulfide compounds such as TiS, and MoS; organic disulfide compounds; and organic polysulfides.

Examples of a material for the negative active material that is capable of reversible intercalation/deintercalation of the lithium ions include carbonaceous materials such as amorphous carbon, crystalline carbon, graphitized carbon fiber, and graphitized mesocarbon microbeads. Examples of amorphous carbon include soft carbon (low-temperature calcinated carbon) that is obtained by heat-treating pitch at 1000° C., and hard carbon (high-temperature calcinated carbon) that is obtained by carbonizing a polymer resin. Examples of crystalline carbon include sheet, flake, sphere, and fiber-shaped natural graphite and artificial graphite.

The separator interposed between the positive and negative electrodes may be a polyethylene, polypropylene, or polyvinylidene fluoride monolayered separator; a polyethylene/polypropylene double layered separator; a polyethylene/polypropylene/polyethylene three layered separator; or a polypropylene/polyethylene/polypropylene three layered separator.

a current collector such as a metal foil or a metal net and forming it into a sheet shape.

An electrode assembly is prepared by winding or laminating a positive electrode and a negative electrode fabricated as above, and interposing a porous insulating film between the positive and negative electrodes, then placing the electrode assembly into a battery case. An electrolyte of the present invention is injected into the case, and the upper part of the battery case is sealed. A cross-sectional structure of the lithium battery prepared by the above process is shown in FIG. 1.

The present invention is further explained in more detail with reference to the following examples. These examples, however, should not in any sense be interpreted as limiting the scope of the present invention.

EXAMPLES 1-10 AND COMPARATIVE EXAMPLES 1-4

Ethylene carbonate/ethylmethyl carbonate/propylene carbonate/fluorobenzene (EC/EMC/PC/FB) were mixed in a volume ratio of 30/55/5/10, and then mixed with γ-butyrolactone (GBL) in order to prepare a non-aqueous organic solvent. 1.1 5M $LiPF_6$ was added to the solvent and additive compounds represented by formulas (5) or (6) and optionally vinylene carbonate and vinyl sulfone were further added in the amounts indicated in Table 1 to prepare electrolytes. In Table 1, the units of amounts of carbonic acid ester compounds of formulas (5) and (6), vinylene carbonate, and vinyl sulfone are weight percents based on the total weight of electrolyte.

TABLE 1

| | Organic solvent (volume %) | | Additive compound | | vinylene | vinyl |
| --- | --- | --- | --- | --- | --- | --- |
| | EC/EMC/PC/FB (volume ratio, 30/55/5/10) | γ-butyrolactone (GBL) | Formula (5) | Formula (6) | carbonate | sulfone |
| Example 1 | 70 | 30 | 1 | 2 | — | — |
| Example 2 | 50 | 50 | 1 | 2 | — | — |
| Example 3 | 30 | 70 | 1 | 2 | — | — |
| Example 4 | 70 | 30 | 1 | — | 2 | — |
| Example 5 | 50 | 50 | 2 | 1 | 1 | — |
| Example 6 | 30 | 70 | 2 | — | 2 | — |
| Example 7 | 30 | 70 | 3 | — | 1 | — |
| Example 8 | 30 | 70 | — | 2 | 2 | — |
| Example 9 | 50 | 50 | 2 | — | — | 0.25 |
| Example 10 | 50 | 50 | — | 2 | — | 0.25 |
| Comp. Example 1 | 30 | 70 | — | — | — | — |
| Comp. Example 2 | 50 | 50 | — | — | — | — |
| Comp. Example 3 | 50 | 50 | — | — | 2 | — |
| Comp. Example 4 | 50 | 50 | — | — | — | 0.25 |
| Comp. Example 5 | 100 | — | — | — | — | — |

A lithium secondary battery is fabricated by the following process. A positive electrode is fabricated by mixing a positive active material, a binder, and a conductive agent then coating it on a current collector such as a metal foil or metal net and forming it into a sheet shape. A negative electrode is fabricated by mixing a negative active material, a binder, and optionally a conductive agent then coating it on $LiCoO_2$ having an average particle diameter of 10 μm as a positive active material, Super P (acetylene black) as a conductive agent, and polyvinylidenefluoride (PVdF) as a binder were mixed in a weight ratio of 94:3:3 in N-methyl-2-pyrrolidone (NMP) to prepare a positive slurry. The slurry was coated on an aluminum foil, dried, and compressed by a roll press, thus producing a positive electrode having a width of 4.9 cm and a thickness of 147 μm. Artificial graphite (PHS) as a negative active material, oxalic acid, and PVdF as a binder were mixed in a weight ratio of 89.8:0.2:10 to prepare a negative slurry. The slurry was coated on a copper foil, dried, and compressed by a roll press, thus producing a negative electrode having a width of 5.1 cm and a thickness of 178 μm. Between the manufactured positive and negative electrodes, a polyethylene porous film separator having a width of 5.35 cm and a thickness of 18 μm was interposed, followed by winding and placement into prismatic cans. 2.3 g of the electrolytes prepared as above were injected into the cans, thus producing a prismatic-type lithium secondary battery cell.

In order to evaluate the swelling inhibition properties, the prismatic lithium secondary battery cells of Examples 1 to 10 and Comparative Examples 1 to 3 were placed in a high temperature chamber at 90° C. for 4 hours, and then the thickness of each cell was measured. The results are shown in Table 2. The data of Table 2 are average values of ten cells.

TABLE 2

|  | Initial Thickness (mm) | Thickness after storage at 90° C. for 4 hours (mm) | Thickness variation ratio (%) |
| --- | --- | --- | --- |
| Example 1 | 6.01 | 6.25 | 0.24 |
| Example 2 | 6.02 | 6.24 | 0.22 |
| Example 3 | 6.00 | 6.31 | 0.31 |
| Example 4 | 6.01 | 6.24 | 0.23 |
| Example 5 | 6.02 | 6.28 | 0.26 |
| Example 6 | 6.01 | 6.25 | 0.24 |
| Example 7 | 6.02 | 6.24 | 0.22 |
| Example 8 | 6.01 | 6.23 | 0.22 |
| Example 9 | 6.00 | 6.17 | 0.17 |
| Example 10 | 6.02 | 6.23 | 0.21 |
| Comp. Example 1 | 6.00 | 6.54 | 0.54 |
| Comp. Example 2 | 6.01 | 6.51 | 0.50 |
| Comp. Example 3 | 6.02 | 6.52 | 0.50 |

As shown in Table 2, swelling inhibition properties at high temperature of the cells of the Examples according to the present invention were superior to those of the Comparative Examples.

Figure 2:
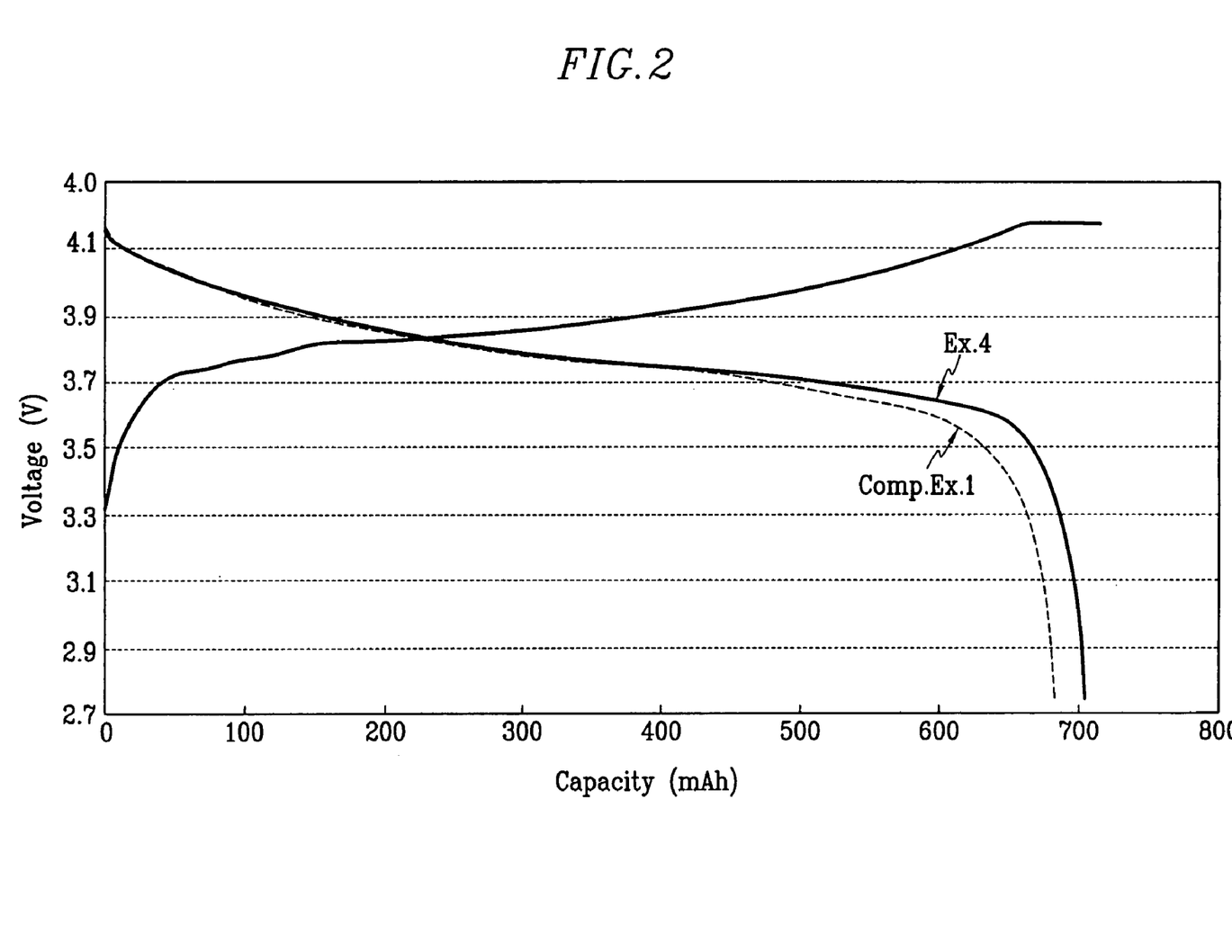
FIG. 2 is a graph illustrating charge-discharge characteristics of the battery cells according to Example 4 of the present invention, and Comparative Example 1.

The lithium battery cells according to the Examples and Comparative Examples were charged at 0.5C with a cut-off voltage of 4.2V under constant current and constant voltage (CC-CV), and then discharged at 0.2C to a cut-off voltage of 2.75V. The charge-discharge results of Example 4 and Comparative Example 1 are shown in FIG. 2. As illustrated in FIG. 2, the charge-discharge characteristic of the cell of Example 4 is much better than that of Comparative Example 1.

Figure 3:
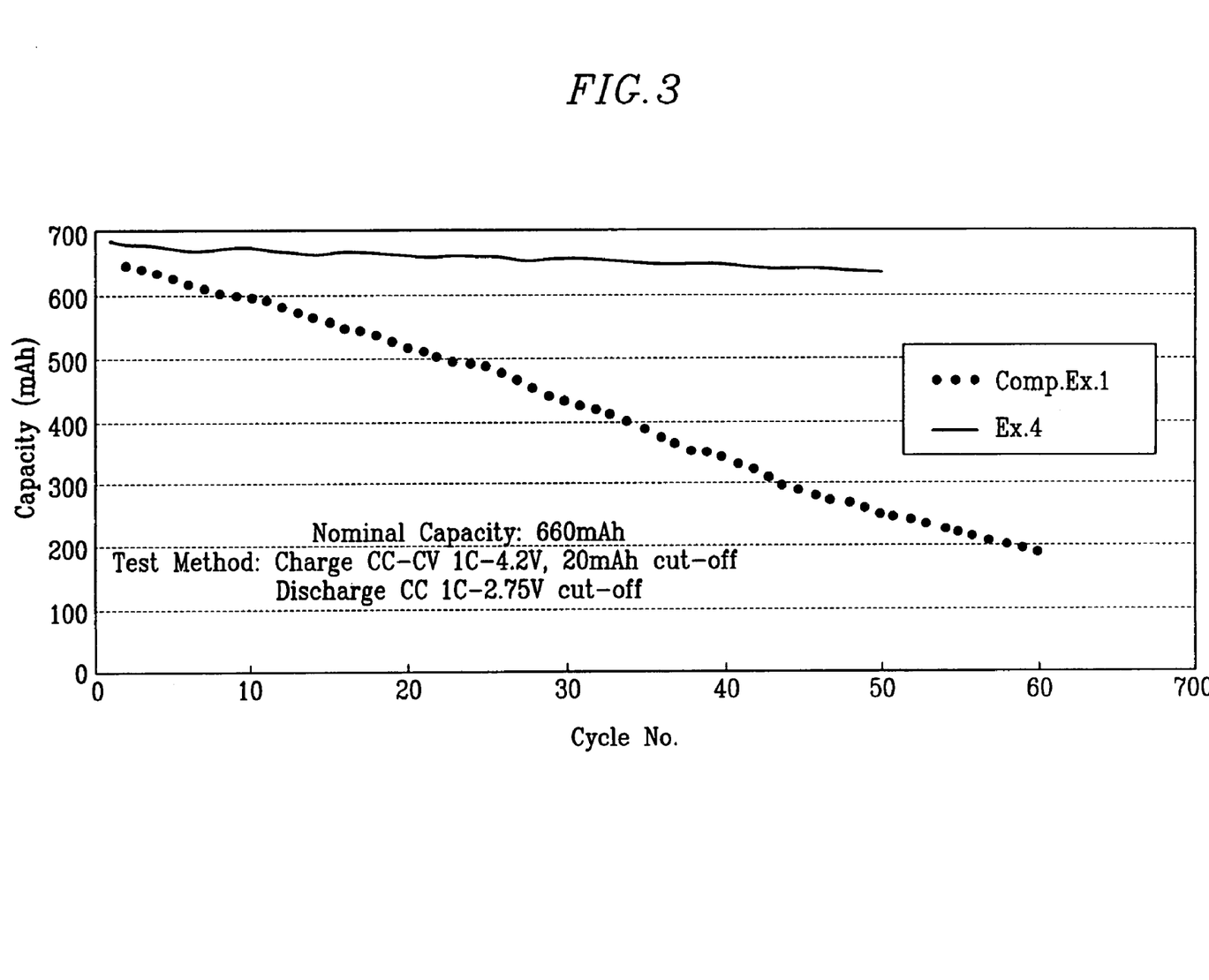
FIG. 3 is a graph illustrating cycle life characteristics of the battery cells according to Example 4 of the present invention, and Comparative Example 1.

The lithium battery cells according to the Examples and Comparative Examples were charged at 0.5C with a cut-off voltage of 4.2V under constant current and constant voltage (CC-CV), and then discharged at 1C to a cut-off voltage of 2.75V. The charge-discharge was repeated to evaluate cycle life characteristics. The cycle life characteristics of Example 4 and Comparative Example 1 are shown in FIG. 3. As illustrated in FIG. 3, Comparative Example 1, which includes γ-butyrolactone but not carbonic acid ester, showed a significant decrease of cycle life, whereas the cycle life of Example 4 was well maintained.

The lithium secondary battery cells including the electrolyte of the present invention have better swelling inhibition properties, as well as electrochemical properties such as cycle life, than the lithium secondary battery cells including the conventional non-aqueous electrolyte that does not have the additive compound of the present invention.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a lithium secondary battery, comprising a non-aqueous organic solvent including 20 to 95 vol % of an ester-based or ether-based organic solvent based on a total amount of organic solvent; one or more lithium salts; and an additive compound having at least two carbonate groups, wherein the additive compound is a carbonic acid ester compound of the following Formula (4):

wherein $R_1$ is hydrogen, a $C_1$ to $C_6$ alkyl, or a $C_6$ to $C_{12}$ aryl; $R_2$ is $(CH_2)_n$, where n is an integer of 1 to 6; $R_3$ is hydrogen, a $C_1$ to $C_6$ alkyl, or a $C_6$ to $C_{12}$ aryl; and $R_4$ and $R_5$ and each independently hydrogen or a $C_1$ to $C_6$ alkyl.

2. The electrolyte for a lithium secondary battery according to claim 1, wherein the ester-based or ether-based organic solvent is used in an amount of 30 to 95 vol %.

3. The electrolyte for a lithium secondary battery according to claim 1, wherein the ester-based organic solvent is selected from the group consisting of γ-butyrolactone (γ-BL), n-methyl acetate, n-ethyl acetate, and n-propyl acetate.

4. The electrolyte for a lithium secondary battery according to claim 1, wherein the ether-based organic solvent is dibutyl ether.

5. The electrolyte for a lithium secondary battery according to claim 1, wherein the non-aqueous organic solvent further comprises a solvent selected from the group consisting of carbonate-based solvents, and mixtures of carbonate-based solvents and aromatic hydrocarbon organic solvents.

6. The electrolyte for a lithium secondary battery according to claim 5, wherein the carbonate-based solvent is selected from the group consisting of dimethyl carbonate (DMC), diethyl carbonate (DEC), methyipropyl carbonate (MPC), ethyipropyl carbonate (EPC), methylethyl carbonate (MEC), ethylene carbonate (EC), propylene carbonate (PC), butylene carbonate (BC), and mixtures thereof.

7. The electrolyte for a lithium secondary battery according to claim 5, wherein the non-aqueous organic solvent comprises an aromatic hydrocarbon organic solvent, wherein the aromatic hydrocarbon organic solvent is represented by Formula (1):

wherein R is selected from the group consisting of halogens and $C_1$ to $C_{10}$ alkyls, and n is an integer ranging from 0 to 6.

8. The electrolyte for a lithium secondary battery according to claim 1, wherein the one or more lithium salts are selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are natural numbers, LiCl, and LiI.

9. The electrolyte for a lithium secondary battery according to claim 8, wherein the one or more lithium salts are present in a concentration ranging from 0.6 to 2.0 M.

10. The electrolyte for a lithium secondary battery according to claim 1, wherein the additive compound is selected from the group consisting of a compound of Formula (5):

(5)

a compound of Formula (6):

(6)

and a mixture thereof.

11. An electrolyte for a lithium secondary battery, comprising a non-aqueous organic solvent including 20 to 95 vol % of an ester-based or ether-based organic solvent based on total amount of organic solvent; one or more lithium salts; and an additive compound represented by the following Formula (2):

(2)

or Formula (3):

(3)

12. The electrolyte for a lithium secondary battery according to claim 1, wherein the additive compound is present in an amount of 0.1 to 10 wt % based on the total amount of the electrolyte.

13. The electrolyte for a lithium secondary battery according to claim 1, wherein the electrolyte further comprises a secondary additive compound selected from the group consisting of vinylene carbonates, organic sulfone-based compounds, and mixtures thereof.

14. The electrolyte for a lithium secondary battery according to claim 13, wherein the secondary additive comprises a vinylene carbonate present in an amount of 0.1 to 50 wt % based on the total amount of the electrolyte.

15. The electrolyte for a lithium secondary battery according to claim 13, wherein the secondary additive comprises a organic sulfone-based compound present in an amount of 0.1 to 5 wt % based on the total amount of the electrolyte.

16. The electrolyte for a lithium secondary battery according to claim 13, wherein the secondary additive compound is an organic sulfone-based compound represented by the following Formula (7):

(7)

wherein $R_6$ and $R_7$ are each independently selected from the group consisting of primary, secondary, and tertiary alkyl groups, alkenyl groups, aryl groups, and cycloalkyl groups.

17. The electrolyte for a lithium secondary battery according to claim 16, wherein one of $R_6$ and $R_7$ is an alkenyl.

18. The electrolyte for a lithium secondary battery according to claim 13, wherein the secondary additive compound is vinyl sulfone.

19. A lithium secondary battery comprising a positive electrode comprising a material that is capable of reversible intercalation/deintercalation of lithium ions;
a negative electrode comprising a negative active material selected from the group consisting of lithium metal, lithium-containing alloys, materials capable of reversible intercalation/deintercalation of lithium ions, and materials capable of reversibly forming lithium-containing compounds;
a separator interposed between the positive and negative electrodes; and
an electrolyte comprising a non-aqueous organic solvent including 20 to 95 vol % of an ester-based or ether-based organic solvent based on the total amount of organic solvent; one or more lithium salts; and an additive compound having at least two carbonate groups, wherein the additive compound is represented by Formula (2):

(2)

compounds represented by Formula (3):

(3)

20. A lithium secondary battery comprising:
a positive electrode comprising a material that is capable of reversible intercalation/deintercalation of lithium ions;
a negative electrode comprising a negative active material selected from the group consisting of lithium metal, lithium-containing alloys, materials capable of reversible intercalation/deintercalation of lithium ions, and materials capable of reversibly forming lithium-containing compounds;
a separator interposed between the positive and negative electrodes; and
an electrolyte comprising a non-aqueous organic solvent including 20 to 95 vol % of an ester-based or ether-based organic solvent based on the total amount of organic solvent; one or more lithium salts; and an additive compound of the following Formula (4):

(4)

wherein $R_1$ is selected from the group consisting of hydrogen, $C_1$ to $C_6$ alkyls, and $C_6$ to $C_{12}$ aryls; $R_2$ is $(CH_2)_n$, where n is an integer ranging from 1 to 6; $R_3$ is selected from the group consisting of hydrogen, $C_1$ to $C_6$ alkyls, and $C_6$ to $C_{12}$ aryls; and $R_4$ and $R_5$ are each independently selected from the group consisting of hydrogen and $C_1$ to $C_6$ alkyls.

21. The lithium secondary battery according to claim 20, wherein the additive compound is selected from the group consisting of compounds represented by Formula (5):

(5)

compounds represented by Formula (6):

(6)

and mixtures thereof.

22. The lithium secondary battery according to claim 20, wherein the additive compound is present in an amount of 0.1 to 10 wt % based on the total amount of the electrolyte.

23. The lithium secondary battery according to claim 20, wherein the electrolyte further comprises a secondary additive compound selected from the group consisting of vinylene carbonates, organic sulfone-based compounds, and mixtures thereof.

24. The lithium secondary battery according to claim 20, wherein the positive active material is a lithium-nickel-based or a lithium-nickel-manganese-based compound.

* * * * *

UNITED STATES PATENT AND TRADEMARK OFFICE
CERTIFICATE OF CORRECTION

PATENT NO. : 7,306,880 B2  Page 1 of 1
APPLICATION NO. : 10/716812
DATED : December 11, 2007
INVENTOR(S) : Hyeong-Gon Noh It is certified that error appears in the above-identified patent and that said Letters Patent is hereby corrected as shown below:

In the Claims

Column 10, line 50, Claim 6   Delete "methyipropyl",
                              Insert --methylpropyl--

Column 10, line 51, Claim 6   Delete "ethyipropyl",
                              Insert --ethylpropyl--

Signed and Sealed this

Fourth Day of November, 2008

JON W. DUDAS
*Director of the United States Patent and Trademark Office*